(12) United States Patent
Lei et al.

(10) Patent No.: US 11,158,027 B2
(45) Date of Patent: Oct. 26, 2021

(54) IMAGE CAPTURING METHOD AND APPARATUS, AND TERMINAL

(71) Applicant: BEIJING XIAOMI MOBILE SOFTWARE CO., LTD., Beijing (CN)

(72) Inventors: Lei Lei, Beijing (CN); Chaoyu Feng, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 39 days.

(21) Appl. No.: 16/544,471

(22) Filed: Aug. 19, 2019

(65) Prior Publication Data

US 2020/0265554 A1    Aug. 20, 2020

(30) Foreign Application Priority Data

Feb. 18, 2019    (CN) .................... 201910124239.2

(51) Int. Cl.
*G06T 3/40*    (2006.01)
*G06T 7/73*    (2017.01)
*H04N 5/232*   (2006.01)

(52) U.S. Cl.
CPC .............. *G06T 3/4053* (2013.01); *G06T 7/73* (2017.01); *H04N 5/23296* (2013.01); *H04N 5/232935* (2018.08); *G06T 2207/30181* (2013.01)

(58) Field of Classification Search
CPC ............ G06T 3/4053; G06T 7/73; G06T 2207/30181; H04N 5/232935; H04N 5/23296; H04N 5/232939; H04N 5/23245; H04N 5/23222; H04N 5/23218; H04N 5/23225; H04N 5/23212; H04N 5/23216; G06N 3/0454; G06N 3/084
See application file for complete search history.

(56) References Cited

U.S. PATENT DOCUMENTS 9,019,415 B2 * 4/2015 Ma .................... H04N 5/232945
                                              348/333.02
10,136,069 B2 * 11/2018 Kim ..................... H04N 5/2258
10,484,598 B2 * 11/2019 Sadhwani .......... H04N 5/23206
10,805,522 B2 * 10/2020 Son ........................ H04N 5/247
(Continued)

FOREIGN PATENT DOCUMENTS

CN    101945217 A    1/2011
CN    102404506 A    4/2012
(Continued)

OTHER PUBLICATIONS

Translated the CN 109218619 Liao Shengyang et al (Year: 2019).*
OA for EP application 19194137.6 mailed Feb. 13, 2020.
OA for CN application 201910124239.2, mailed on Mar. 12, 2021.

*Primary Examiner* — Nancy Bitar
(74) *Attorney, Agent, or Firm* — Syncoda LLC; Feng Ma

(57) ABSTRACT

An image capturing method includes: displaying an image capturing preview interface of an image capturing program, the image capturing preview interface displaying a preview image; identifying an image capturing scene of the preview image by calling a machine learning model; and activating a moon image capturing mode in the image capturing program when the image capturing scene is a moon image capturing scene, the moon image capturing mode being an image capturing mode configured to capture image of the moon in a night sky.

13 Claims, 9 Drawing Sheets

--- displaying an image capturing preview interface of an image capturing program, the image capturing preview interface displaying a preview image — 102 identifying an image capturing scene of the preview image by calling a machine learning model — 104 activating a moon image capturing mode in the image capturing program when the image capturing scene is a moon image capturing scene — 106

(56) References Cited

U.S. PATENT DOCUMENTS

| | | | |
|---|---|---|---|
| 2010/0134641 A1* | 6/2010 | Marti | H04N 5/2624 |
| | | | 348/222.1 |
| 2011/0050909 A1* | 3/2011 | Ellenby | G03B 17/24 |
| | | | 348/207.1 |
| 2013/0188061 A1* | 7/2013 | Ellenby | H04N 5/23222 |
| | | | 348/207.1 |
| 2017/0064180 A1* | 3/2017 | Kitagawa | H04N 5/23296 |
| 2017/0208239 A1 | 7/2017 | Chien et al. | |
| 2017/0359494 A1 | 12/2017 | Zhou et al. | |
| 2018/0350106 A1* | 12/2018 | Kasilya Sudarsan | ........................ |
| | | | H04N 5/232939 |
| 2019/0174056 A1* | 6/2019 | Jung | H04N 5/232935 |

FOREIGN PATENT DOCUMENTS

| | | | |
|---|---|---|---|
| CN | 107820020 A | | 3/2018 |
| CN | 108632536 A | | 10/2018 |
| CN | 109218619 A | * | 1/2019 |
| CN | 109218619 A | | 1/2019 |
| WO | 2019107724 A1 | | 6/2019 |
| WO | WO2020168956 | * | 8/2020 |

\* cited by examiner

IMAGE CAPTURING METHOD AND APPARATUS, AND TERMINAL

CROSS-REFERENCE TO RELATED APPLICATIONS

This application claims priority to Chinese Patent Application Serial No. 201910124239.2 filed on Feb. 18, 2019, the disclosure of which is incorporated herein by reference in its entirety.

BACKGROUND

Image capturing is often the most widely used function of a mobile terminal. When a user takes an image or video with the mobile terminal, the image or video is often about a portrait of a person and/or surrounding scenes. An image capturing program in the mobile terminal is usually provided with an "Auto" mode, which may automatically and reasonably adjust image capturing parameters according to preview images captured by a camera.

In some occasions, the mobile terminal may be used to capture the image of the moon in the sky. Due to the long distance between the moon and the mobile terminal and a great luminance difference between the moon and the night sky, the Auto mode suitable for portraits and surrounding scenes cannot be adjusted to have suitable image capturing parameters, and thus the images captured often are of poor quality.

SUMMARY

The present disclosure relates to a field of image processing, and particularly, to an image capturing method, an image capturing device, a terminal and a readable storage medium.

The present disclosure provides an image capturing method, an image capturing device, a terminal and a readable storage medium.

According to a first aspect of the present disclosure, an image capturing method is provided. The method includes:

displaying an image capturing preview interface of an image capturing program, the image capturing preview interface displaying a preview image;

identifying an image capturing scene of the preview image by calling a machine learning model; and activating a moon image capturing mode in the image capturing program when the image capturing scene belongs to a moon image capturing scene, the moon image capturing mode being an image capturing mode configured to shoot the moon in the sky.

According to a second aspect of the present disclosure, an image capturing device is provided. The device includes a processor and a memory. The memory is configured to store one or more software modules executable by the processor. The processor is configured to execute the one or more software modules by reading the one or more software modules stored in the memory. The one or more software modules include:

a display module configured to display an image capturing preview interface of an image capturing program, the image capturing preview interface displaying a preview image;

a processing module configured to identify an image capturing scene of the image capturing preview image by calling a machine learning model; and an image capturing module configured to activate a moon image capturing mode in the image capturing program when the image capturing scene belongs to a moon image capturing scene, the moon image capturing mode being an image capturing mode configured to shoot the moon in the sky.

According to a third aspect of the present disclosure, a terminal is provided. The terminal includes a processor and a memory, wherein the memory is configured to store at least one instruction, at least one program, a code set or an instruction set, and the at least one instruction, the at least one segment of the program, the code set or the instruction set is configured to be loaded and executed by the processor to implement the image capturing method as described in the first aspect.

According to a fourth aspect of the present disclosure, a computer readable storage medium is provided. The readable storage medium is configured to store at least one instruction, at least one program, a code set or an instruction set, and the at least one instruction, the at least one program, the code set or the instruction set is configured to be loaded and executed by the processor to implement the image capturing method as described in the first aspect.

It should be understood that both the foregoing general description and the following detailed description are exemplary and explanatory only and are not restrictive of the disclosure. Other aspects and embodiments of the present disclosure will become clear to those of ordinary skill in the art in view of the following description and the attached drawings.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Figure 1:
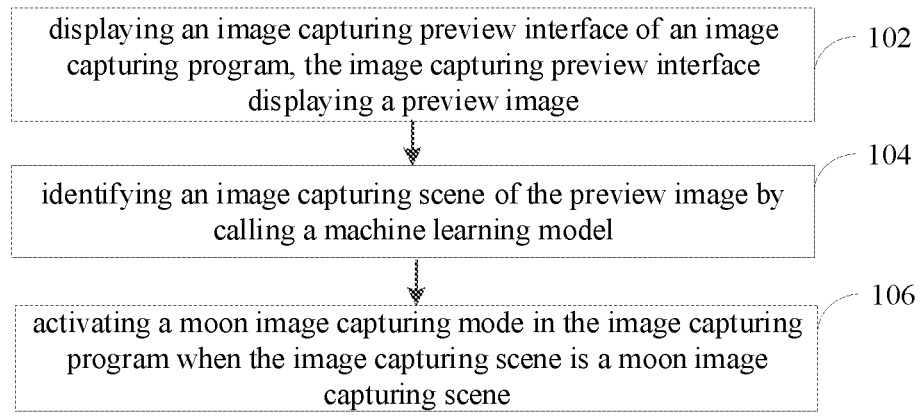
FIG. 1 is a flowchart of an image capturing method according to some embodiments.

FIG. 1 illustrates a flowchart of an image capturing method provided by some embodiments of the present disclosure. The method may be implemented by a terminal provided with a camera and includes the following steps.

In step 102, an image capturing preview interface of an image capturing program is displayed. The image capturing preview interface displays an image capturing preview image.

The terminal is provided with the image capturing program, which may either be a default image capturing program provided by the manufacturer of the terminal, or a third-party image capturing program installed by a user.

When there is a need for image capturing, the user activates the image capturing program in the terminal. For example, the user activates the image capturing program through clicking the icon representing the image capturing program on the touch screen of the terminal.

When the image capturing program is activated, the image capturing preview interface of the image capturing program is displayed. The image capturing preview interface displays the preview image. In some embodiments, the image capturing preview interface further displays at least one of an image capturing button, an activation control of a plurality of image capturing modes, a flasher switch, a button to switch front and rear cameras and a timing image capturing button.

The preview image is an image captured by a camera currently used. The preview image will be stored as an image capturing image after a shutter signal is received.

In step 104, an image capturing scene of the preview image is identified by calling a machine learning model.

The terminal inputs the preview image into the machine learning model for identification of the image capturing scene.

The machine learning model is configured to identify whether the current image capturing scene is a moon image capturing scene. The moon image capturing scene is a scene where the moon is the current image capturing object.

In some embodiments, the machine learning model is a neural network model, such as a convolutional neural network model.

In step 106, a moon image capturing mode in the image capturing program is activated when the image capturing scene is the moon image capturing scene, for example in low-light scene.

The moon image capturing mode can be an image capturing mode configured to capture the image of the moon in the sky, or an image in other dark environment or low-light settings. Image capturing parameters under the moon image capturing mode are parameters set for the moon image capturing scene.

In some embodiments, the image capturing parameters under the moon image capturing mode can include the following.

First, setting the light-measuring method of the automatic exposure (AE) mode as a local light-measuring method, which is a method that performs light-measuring based on a pixel area where the luminance value is higher than a first threshold.

Second, setting the focusing length of the automatic focus (AF) mode as an infinite focal length, or, setting the focusing length of the automatic focus mode as a preset focal length, in which the difference between the preset focal length and the infinite focal length is less than a second threshold.

As such, with the image capturing method provided by this embodiment, the image capturing scene of the preview image is identified by calling the machine learning model. When the image capturing scene belongs to the moon scene, the moon image capturing mode in the image capturing program may be activated, such that the moon image with a better image quality may be captured. Since the moon image capturing mode has corresponding image capturing parameters, rather than image capturing parameters automatically generated by an Auto mode, it is possible for the present disclosure to solve the problem that the Auto mode suitable for portraits and surrounding scenes cannot be adjusted to suitable image capturing parameters, and thus the images captured are of poor quality.

In an alternative embodiment based on FIG. 1, a plurality of machine learning models are provided in the terminal, each of which is configured to identify one image capturing scene. The plurality of machine learning models include, but are not limited to: a first machine learning model for identifying a night view image capturing scene, a second machine learning model for identifying a moon image capturing scene, a third machine learning model for identifying a portrait image capturing scene, a fourth machine learning model for identifying a macro image capturing scene, a fifth machine learning model for identifying a food image capturing scene, a sixth machine learning model for identifying a flower image capturing scene, etc.

Figure 2:
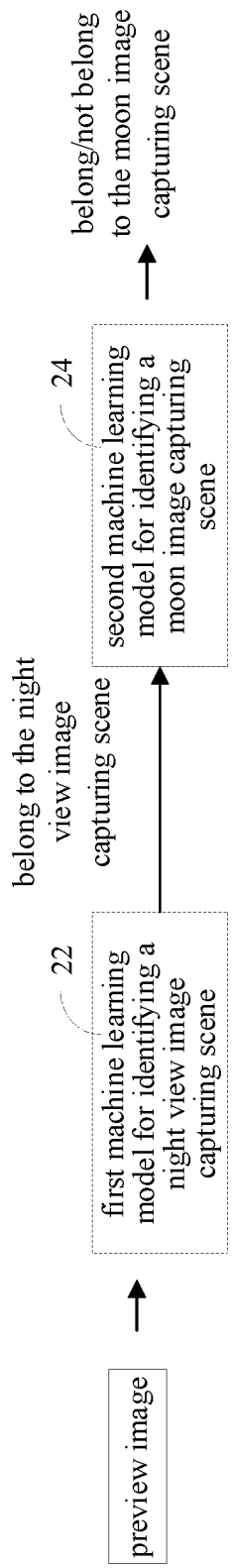
FIG. 2 is a schematic diagram of a machine learning model for identifying a moon image capturing scene provided by some embodiments of the present disclosure.

In some embodiments, since the moon image capturing mode is one of the night view image capturing modes, when the first machine learning model 22 identifies that the current image capturing scene belongs to the night view image capturing scene, the second machine learning model is called to identify whether the current image capturing scene belongs to the moon image capturing scene, and whether the current image capturing scene belongs to a normal scene or other AI image capturing scene, as schematically illustrated in FIG. 2.

Figure 3:
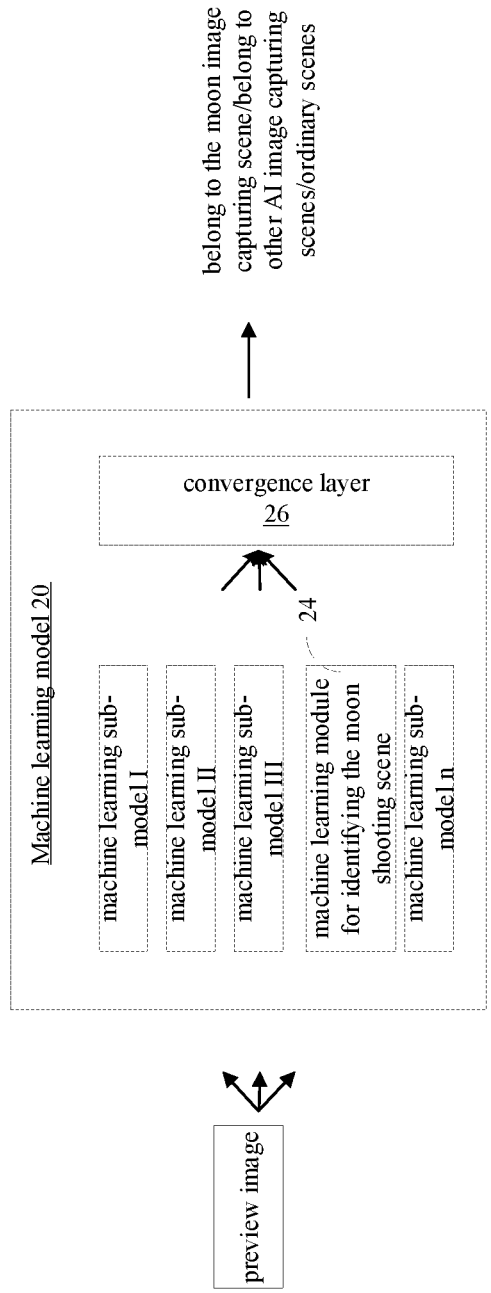
FIG. 3 is a schematic diagram of a machine learning model for identifying a moon image capturing scene provided by some other embodiments of the present disclosure.

In an alternative embodiment based on FIG. 1, the machine learning model provided in the terminal is a machine learning model 20 consisting of a plurality of machine learning sub-models. The machine learning model 24 for identifying the moon image capturing scene is one of the plurality of machine learning sub-models. When each of the machine learning sub-models outputs identification result of itself, the final identification result is output by a convergence layer 24, as schematically illustrated in FIG. 3.

In an alternative embodiment based on FIG. 1, the machine learning model for identifying the moon image capturing scene is obtained based on training sample images in a training set with an error back propagation algorithm. The training set includes a positive sample image set and a negative sample image set.

The positive sample image set includes moon images and artificial moon images shot by a test terminal. The test terminal is a terminal used in the research and development process. The performance of the test terminal is identical or similar to that of the terminal.

On one hand, the researchers obtain a plurality of moon images by taking pictures of the moon at different time, places and ambient light scenes with the Auto mode in the test terminal, and add the plurality of moon images to the positive sample image set.

On the other hand, the researchers may also obtain a moon region in the moon image shot by the test terminal through image matting, thereby obtaining a moon region image. Then, the researchers collect (for example, through network downloading) night sky images without the moon, which may be shot upwardly and include environmental elements like buildings. The researchers obtain artificial moon images by synthesizing the night sky images and the moon region images, and add the artificial moon images to the positive sample image set.

The negative sample image set includes non-moon images. The non-moon images include images without the moon and night sky images with a suspected moon that is not the moon. The night sky images with a suspected moon that is not the moon include streetlight images. These images obtained by test terminals or by other users can be stored in a cloud, and available for downloading to be used by the mobile terminal according to various embodiments of the present disclosure.

The above image capturing method may be applied to a terminal provided with a single camera, or a terminal provided with a plurality of cameras. The terminal provided with the plurality of cameras includes: a dual-camera terminal provided with two cameras, a tri-camera terminal provided with three cameras, and a tetra-camera terminal provided with four cameras.

The above image capturing method applied to the terminal provided with a single camera is described with reference to FIG. 4; and the above image capturing method applied to the terminal provided with the plurality of cameras is described with reference to FIG. 6.

Figure 4:
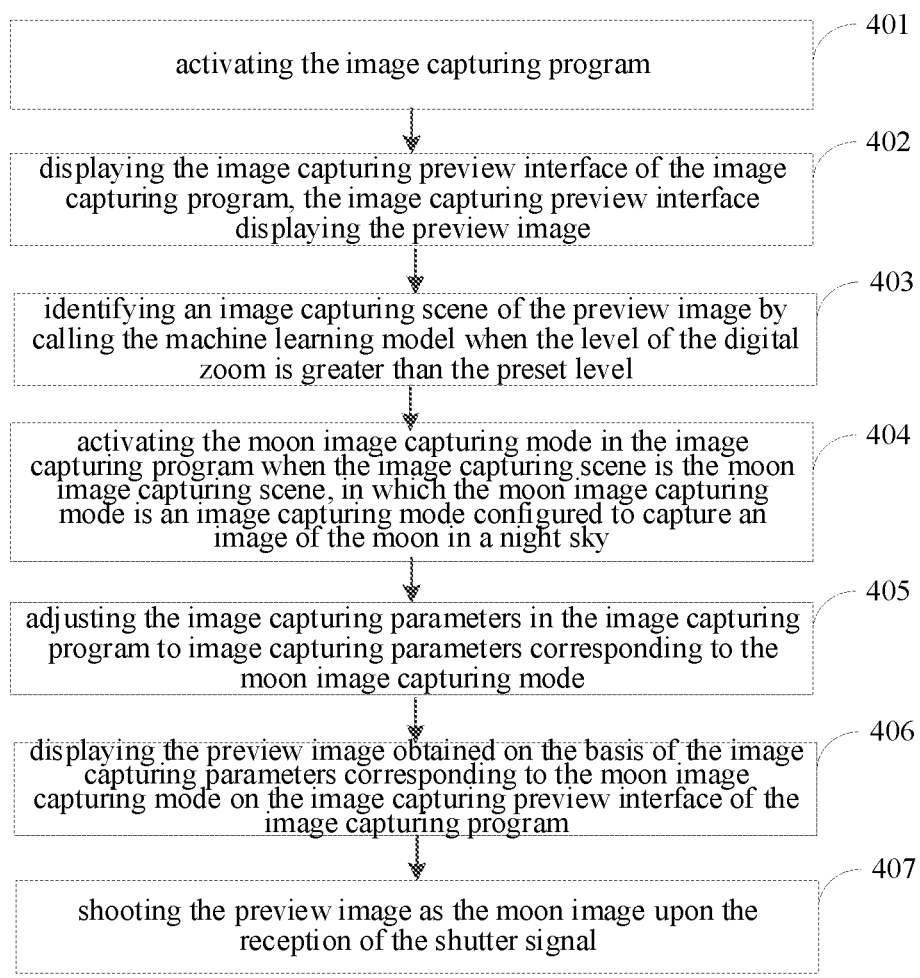
FIG. 4 is a flowchart of an image capturing method provided by another exemplary embodiment of the present disclosure.

FIG. 4 is a flowchart of an image capturing method provided by another exemplary embodiment of the present disclosure. The method may be implemented by the terminal provided with a single camera and includes the following steps.

In step 401, the image capturing program is activated.

The terminal is provided with the image capturing program, which may either be a default image capturing program provided by the manufacturer of the terminal, or a third-party image capturing program installed by a user.

When there is a need for image capturing, the user activates the image capturing program in the terminal. For example, the user activates the image capturing program through clicking the icon representing the image capturing program on the touch screen of the terminal.

In step 402, the image capturing preview interface of the image capturing program is displayed. The image capturing preview interface displays the preview image.

When the image capturing program is activated, the image capturing preview interface of the image capturing program is displayed. The image capturing preview interface displays the preview image. In some embodiments, the image capturing preview interface further displays at least one of an image capturing button, an activation control of a plurality of image capturing modes, a flasher switch, a button to switch front and rear cameras and a timing image capturing button.

Figure 5A:
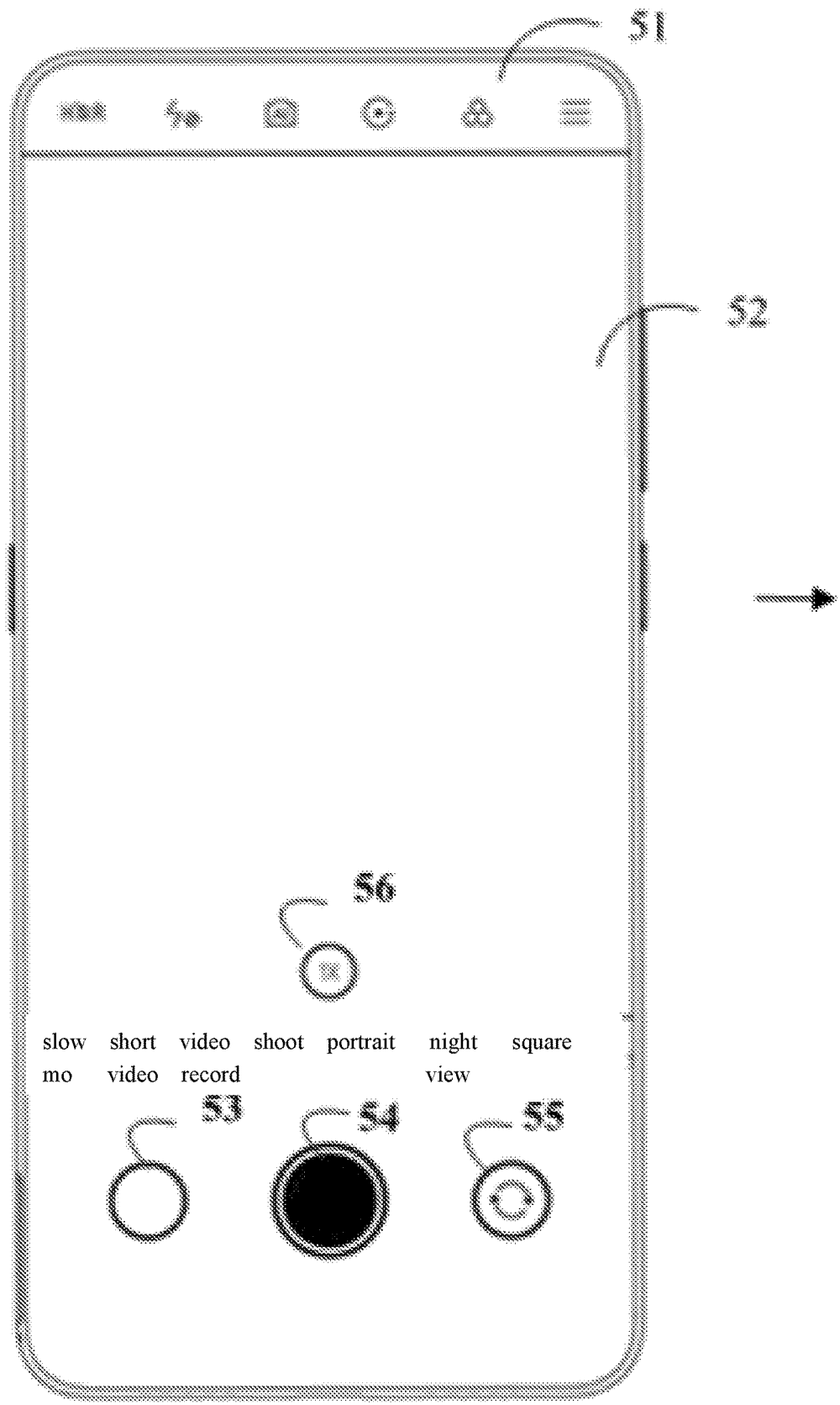
FIG. 5A is a schematic diagram of a first interface illustrating an image capturing method provided by some embodiments of the present disclosure.
Figure 5B:
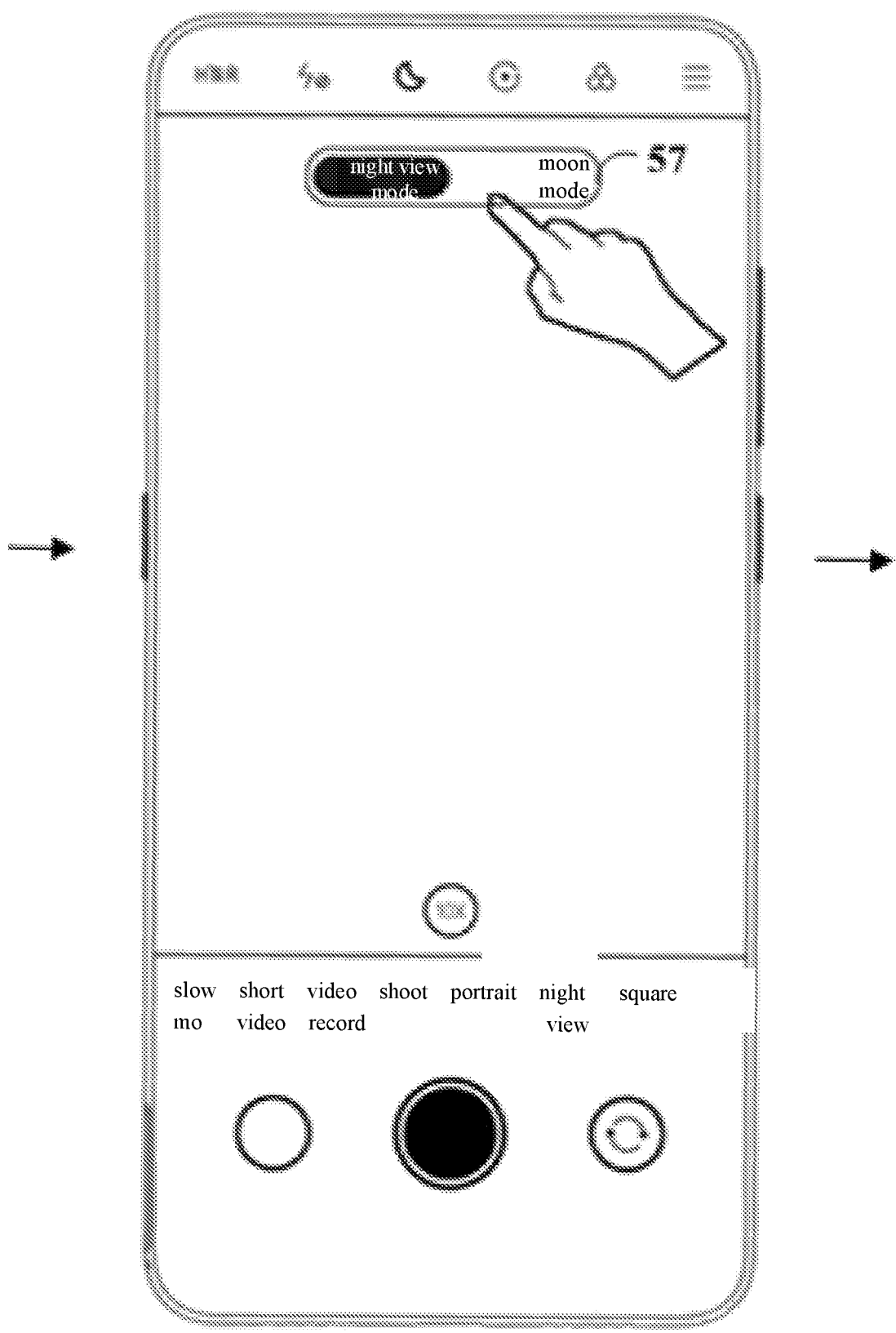
FIG. 5B is a schematic diagram of a second interface illustrating an image capturing method provided by some embodiments of the present disclosure.
Figure 5C:
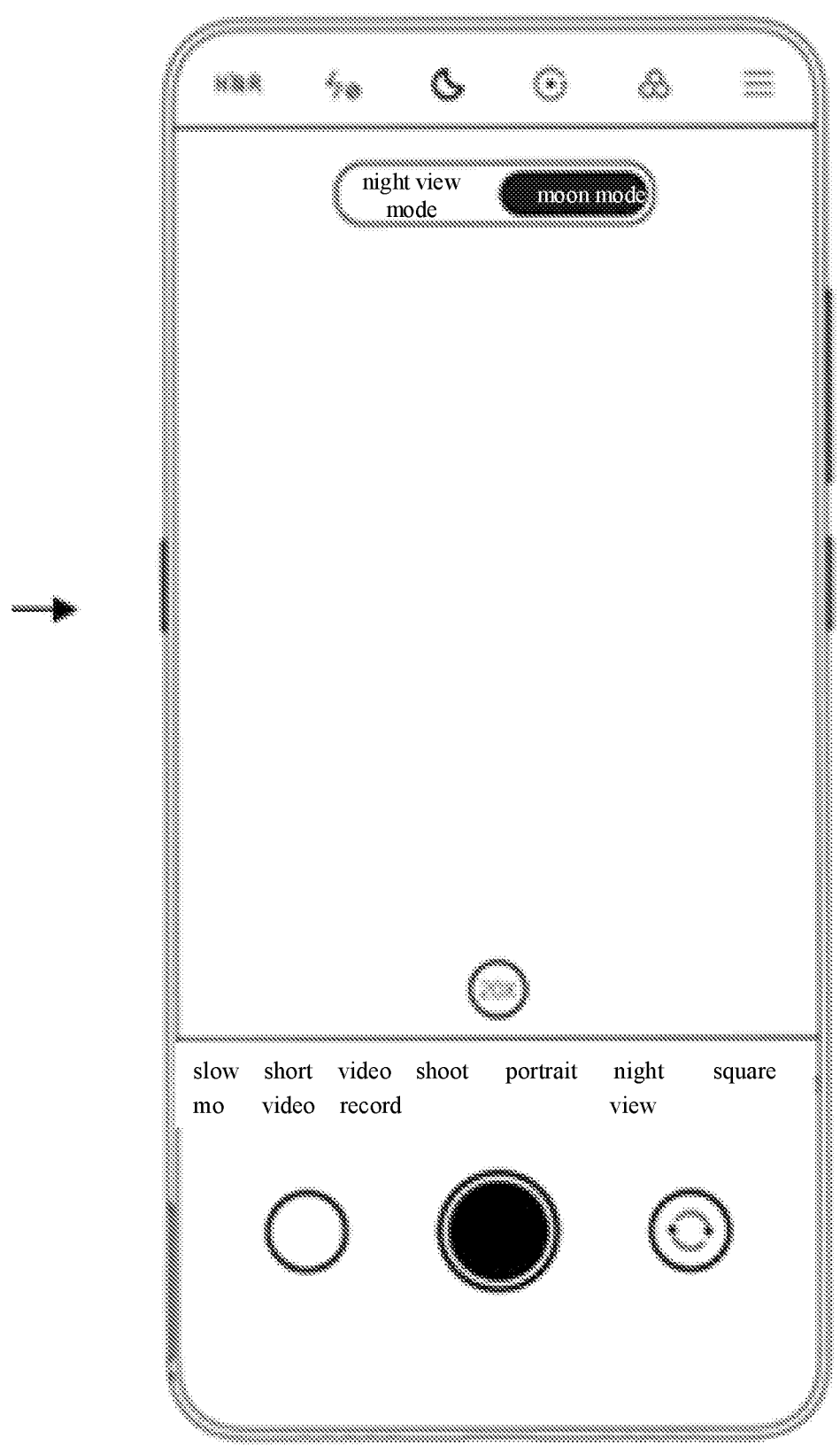
FIG. 5C is a schematic diagram of a third interface illustrating an image capturing method provided by some embodiments of the present disclosure.

Referring to FIG. 5A, FIG. 5B, and FIG. 5C, an upper portion 51 of the image capturing preview interface displays a turn-on/off control for the flasher, a turn-on/off control for high-dynamic range (HDR) images, a turn-on/off control for an AI function and a turn-on/off control for special effects from the left to the right. A middle part 52 of the image capturing preview interface displays the preview images. A lower part of the image capturing preview interface displays a start button 53 for a photo album, an image capturing button 54 and a button 55 to switch front and rear cameras from the left to the right. In some embodiments, the middle portion 52 of the image capturing preview interface further displays a ZOOM level 56.

In some embodiments, the image capturing preview interface further has a function of setting a focusing level of a digital zoom "ZOOM." The digital zoom refers to implementing zoom image capturing by using digital difference values. In some embodiments, an available level range of the digital zoom ranges from 1.0× zoom to 10.× zoom.

In some embodiments, the user performs a two-finger zoom-in gesture in the image capturing preview interface to control the digital zoom level in the image capturing program to increase; and the user performs a two-finger zoom-out gesture in the image capturing preview interface to control the digital zoom level in the image capturing program to decrease.

In step 403, an image capturing scene of the preview image is identified by calling the machine learning model when the level of the digital zoom is greater than the preset level.

When the ZOOM level is greater than the preset level, the terminal calls the machine learning model to identify the image capturing scene of the preview image. The machine learning machine is a model for identifying the moon image capturing scene.

When the user increases the ZOOM level in the night view image capturing mode, it is very likely that the user wants to shoot the moon. In an alternative embodiment, when the ZOOM level is greater than the preset level and the night view image capturing mode is currently used, the machine learning mode is called to identify the image capturing scene of the preview image.

The preset level is arranged according to a relatively high value in commonly-used ZOOM levels of the user. The commonly-used ZOOM levels are levels used while taking pictures of people or surrounding scenes. In some embodiments, the preset level is 4.0×.

In step 404, the moon image capturing mode in the image capturing program is activated when the image capturing scene belongs to the moon image capturing scene. The moon image capturing mode is an image capturing mode arranged for image capturing the moon in the sky.

In some embodiments, the image capturing program provides a plurality of image capturing modes: a portrait image capturing mode, a food image capturing mode, a night view image capturing mode, a flower image capturing mode, a macro image capturing mode, a large aperture image capturing mode, the moon image capturing mode and so on. Each image capturing mode has corresponding image capturing parameters.

In some embodiments, when the image capturing scene belongs to the moon image capturing scene, an activation control of the moon image capturing mode is displayed on the image capturing preview interface. The moon image capturing mode in the image capturing program is activated when the trigger signal on the activation control is received. The activation control may be a button control, a switch control and the like. For example, the activation control is a switch control of the moon image capturing mode and the night view image capturing mode.

As illustrated in FIG. 5B and FIG. 5C, the switch control 57 of the moon image capturing mode and the night view image capturing mode is taken as an example as the activation control. When the user clicks the left area of the control 57, the image capturing mode of the image capturing program is switched to the night view image capturing mode; and when the user clicks the right area of the control 57, the image capturing mode of the image capturing program is switched to the moon image capturing mode.

In step 405, the image capturing parameters in the image capturing program are adjusted to image capturing parameters corresponding to the moon image capturing mode.

The image capturing parameters include at least one of: an automatic exposure (AE) mode parameter, an automatic focus (AF) mode parameter, a ZOOM parameter, a color temperature (which is also referred to as white balance) parameter and a clarity (which is also referred to as acuteness) parameter.

In some embodiments, adjusting the image capturing parameters under the moon image capturing mode at least includes the following.

First, setting the light-measuring method of the AE mode as a local light-measuring method, which is a method that performs light-measuring based on a pixel area where the luminance value is higher than a first threshold.

The default mode of the automatic exposure mode is a global light-measuring mode, which performs light-measuring by using luminance values of all the pixel points in the preview image. Since in the moon image capturing scene, the area occupied by the moon in the whole preview image is relatively small and the rest area is basically the dark night sky, the exposure value measured by the global metering mode is rather low, resulting in overexposure of the captured moon image.

Consequently, when the image capturing program is in the moon image capturing mode, the terminal changes the light-measuring method of AE into the local light-measuring method, which is a method that performs light-measuring based on a pixel area where the luminance value is higher than a first threshold. For example, when YUV (luminance and chrominance are separated) is adopted as a color-coding method, the light-measuring is performed using the pixel whose luminance Y is greater than 50. That is, the terminal regards the local moon area in the preview image as the light-measuring area and ignores the non-moon area as much as possible.

Second, setting the focusing length of the AF mode as an infinite focal length, or, setting the focusing length of the automatic focus mode as a preset focal length, in which the difference between the preset focal length and the infinite focal length is less than a second threshold.

The distance between the moon and the terminal is very far, which is much greater than the focal length used by the user for daily image capturing. In the moon image capturing mode, the focusing length of AF may be set as the infinite focal length, or close to the infinite focal length.

In some embodiments, adjusting the image capturing parameters in the moon image capturing mode further includes at least one of the following methods.

Third, increasing the available level range of ZOOM from the first level range to the second level range, in which the maximum level of the second level range is greater than that of the first level range.

Since the moon is far away from the terminal, apart from setting the focusing length of AF as the infinite focal length, the available level range of ZOOM may further be increased from the first level range to the second level range, in which the maximum level of the second level range is greater than that of the first level range. The first level range refers to the ZOOM level range adopted by the Auto mode or the night view mode.

In some embodiments, the minimum level of the first level range is the same as that of the second level range, and the maximum level of the second level range is twice as much as that of the first level range. For example, the first level range is [1.0×, 10×] and the second level range is [1.0×, 20×].

In some embodiments, the minimum level of the second level range is the same as the maximum level of the first level range, and the maximum level of the second level range is twice as much as that of the first level range. For example, the first level range is [1.0×, 10×] and the second level range is [10×, 20×].

Fourth, adjusting the color temperature of the pixel area where the luminance value is greater than the first threshold to a preset color temperature range.

In the moon image capturing mode, the white balance of the preview image is mainly affected by the moon area. The terminal adjusts the color temperature of the pixel area (i.e., the moon area) where the luminance value is greater than the first threshold to the preset color temperature range. Or, in other words, the color temperature in the image capturing parameters is adjusted to the preset color temperature range on the basis of the color temperature of the pixel area (i.e., the moon area) where the luminance value is greater than the first threshold. In some embodiments, the preset color temperature range ranges from 4,500 K to 5,000 K, K being an abbreviation of a unit Kelvin.

Fifth, adjusting the image clarity to a preset clarity range.

In the moon image capturing mode, the terminal further adjusts the image clarity (acuteness) of the preview image to the preset clarity range through a dynamic adjusting algorithm. In some embodiments, the clarity adjustment and the ZOOM level adjustment may be associated with each other. For example, the ZOOM level is dynamically adjusted to a certain level close to the maximum level, thereby obtaining a better image clarity.

In step 406, the preview image obtained on the basis of the image capturing parameters corresponding to the moon image capturing mode is displayed on the image capturing preview interface of the image capturing program.

In step 407, the preview image is shot as the moon image upon the reception of the shutter signal.

The shutter signal is a signal used for triggering image capturing. The shutter signal may either be triggered by the user, or automatically generated by the terminal. For example, the shutter signal is generated when the user touches the image capturing button. Or, the shutter signal is generated when the user double-clicks a lower part of a volume button. In this embodiment, the generation method of the shutter signal is not limited.

As such, with the method provided in this embodiment, the image capturing scene of the preview image is identified by calling the machine learning model. When the image capturing scene belongs to the moon scene, the moon image capturing mode in the image capturing program may be activated to capture the moon image, such that the moon image with the better image quality may be captured.

With the method provided in this embodiment, the machine learning model is further called to identify the image capturing scene of the preview image when the level of ZOOM is greater than the preset level. The machine learning model is called to perform calculations only when the user intends to shoot the moon, thereby reducing unnecessary calculations and reducing performance occupation and power loss resulted from the calculations of the machine learning model.

With the method provided in this embodiment, the light-measuring mode of AE is adjusted to the local light-measuring mode, thereby avoiding an inaccurate light-measuring of the global light-measuring mode in the moon image capturing scene. Consequently, the overexposure may be avoided in the moon area, and a reasonably exposed moon image can be obtained.

With the method provided in this embodiment, the focusing length of AF is adjusted to infinity or approach infinity, thereby overcoming the defect that the automatic focus cannot focus at an appropriate focal length due to a long distance between the moon and the terminal, and improving the quality of the captured moon image.

With the method provided in this embodiment, the available level range of ZOOM is adjusted to the second level range, thereby overcoming the defect that the level range used in the Auto mode cannot zoom into an appropriate focal length due to a long distance between the moon and the terminal. The second level range at a higher rank is adopted to improve the quality of the captured moon image.

Figure 6:
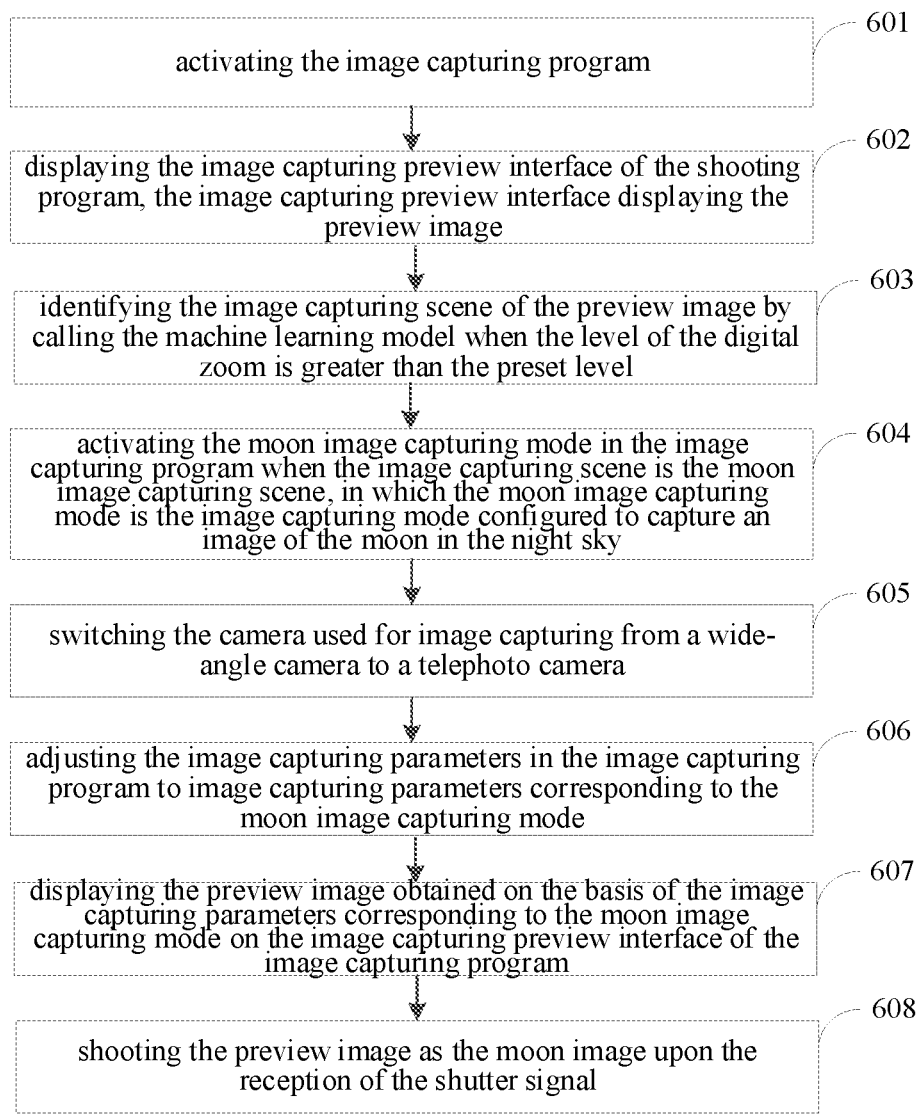
FIG. 6 is a flowchart of an image capturing method provided by yet another exemplary embodiment of the present disclosure.

FIG. 6 is a flowchart of an image capturing method provided by yet another exemplary embodiment of the present disclosure. The method may be implemented by a terminal provided with a plurality of cameras, which may include a wide-angle camera and a telephoto camera. The method includes the following steps.

In step 601, the image capturing program is activated.

The terminal is provided with the image capturing program, which may either be a default image capturing program provided by the manufacturer of the terminal, or a third-party image capturing program installed by a user.

When there is a need for image capturing, the user activates the image capturing program in the terminal. For example, the user activates the image capturing program by clicking the icon representing the image capturing program on the touch screen of the terminal.

In step 602, the image capturing preview interface of the image capturing program is displayed. The image capturing preview interface displays the preview image.

When the image capturing program is activated, the image capturing preview interface of the image capturing program is displayed. The image capturing preview interface displays the preview image. In some embodiments, the image capturing preview interface further displays at least one of the image capturing button, the activation control of the plurality of image capturing modes, the flasher switch, the button to switch front and rear cameras and the timing image capturing button.

Referring to FIG. 5A, FIG. 5B, and FIG. 5C, the upper portion 51 of the image capturing preview interface displays the turn-on/off control for the flasher, the turn-on/off control for high-dynamic range (HDR) images, the turn-on/off control for the AI function and the turn-on/off control for special effects from the left to the right. The middle portion 52 of the image capturing preview interface displays the preview image. The lower part of the image capturing preview interface displays the start button 53 for the photo album, the image capturing button 54 and the button 55 to switch front and rear cameras from the left to the right. In some embodiments, the middle part 52 of the image capturing preview interface further displays the ZOOM level 56.

In some embodiments, the image capturing preview interface further has the function of setting the focusing level of the digital zoom ZOOM. The digital zoom refers to implementing zoom image capturing using digital difference values. In some embodiments, an available level range of the digital zoom ranges from 1.0× zoom to 10.× zoom.

In some embodiments, the user performs the two-finger zoom-in gesture in the image capturing preview interface to control the digital zoom level in the image capturing program to increase; and the user performs the two-finger zoom-out gesture in the image capturing preview interface to control the digital zoom level in the image capturing program to decrease.

In step 603, the image capturing scene of the preview image is identified by calling the machine learning model when the level of the digital zoom is greater than the preset level.

When the ZOOM level is greater than the preset level, the terminal calls the machine learning model to identify the image capturing scene of the preview image. The machine learning machine is the model for identifying the moon image capturing scene.

When the user increases the ZOOM level in the night view image capturing mode, it is very likely that the user wants to shoot the moon. In an alternative embodiment, when the ZOOM level is greater than the preset level and the night view image capturing mode is currently used, the machine learning mode is called to identify the image capturing scene of the preview image.

The preset level is arranged according to a relatively high value in commonly-used ZOOM levels of the user. The commonly-used ZOOM levels are levels used while taking pictures of people or surrounding scenes. In some embodiments, the preset level is 4.0×.

In step 604, the moon image capturing mode in the image capturing program is activated when the image capturing scene belongs to the moon image capturing scene. The moon image capturing mode is the image capturing mode arranged for image capturing the moon in the sky.

In some embodiments, the image capturing program provides a plurality of image capturing modes: the portrait image capturing mode, the food image capturing mode, the night view image capturing mode, the flower image capturing mode, the macro image capturing mode, the large aperture image capturing mode, the moon image capturing mode and so on. Each image capturing mode has corresponding image capturing parameters.

In some embodiments, when the image capturing scene belongs to the moon image capturing scene, the activation control of the moon image capturing mode is displayed on the image capturing preview interface. The moon image capturing mode in the image capturing program is activated when the trigger signal on the activation control is received. The activation control may be the button control, the switch control and the like. For example, the activation control is the switch control of the moon image capturing mode and the night view image capturing mode.

As illustrated in FIG. 5A, FIG. 5B, and FIG. 5C, the switch control of the moon image capturing mode and the night view image capturing mode is taken as an example of the activation control. When the user clicks the left area of the control, the image capturing mode of the image capturing program is switched to the night view image capturing mode; and when the user clicks the right area of the control, the image capturing mode of the image capturing program is switched to the moon image capturing mode.

In step 605, the camera used for image capturing is switched from the wide-angle camera to the telephoto camera.

In step 606, the image capturing parameters in the image capturing program are adjusted to image capturing parameters corresponding to the moon image capturing mode.

The image capturing parameters include at least one of: AE parameter, AF parameter, ZOOM parameter, color temperature (which is also referred to as white balance) parameter and clarity (which is also referred to as acuteness) parameter.

In some embodiments, adjusting the image capturing parameters under the moon image capturing mode at least includes the following.

First, setting the light-measuring method of the AE mode as the local light-measuring method, which is a method that performs light-measuring based on the pixel area where the luminance value is higher than the first threshold.

The default mode of the automatic exposure mode is the global light-measuring mode, which performs light-measuring using luminance values of all the pixel points in the preview image. Since in the moon image capturing scene, the area occupied by the moon in the whole preview image is relatively small and the rest area is basically the dark night sky, the exposure value measured by the global light-measuring mode is rather low, resulting in overexposure of the captured moon image.

Consequently, when the image capturing program is in the moon image capturing mode, the terminal changes the light-measuring method of AE into the local light-measuring method, which is a method that performs light-measuring based on the pixel area where the luminance value is higher than the first threshold. For example, when YUV (luminance and chrominance are separated) is adopted as the color-coding method, the light-measuring is performed using the pixel whose luminance Y is greater than 50. That is, the terminal regards the local area of the moon in the preview image as the light-measuring area and ignores the non-moon area as much as possible.

Second, setting the focusing length of the AF mode as the infinite focal length, or, setting the focusing length of the automatic focus mode as the preset focal length, in which the difference between the preset focal length and the infinite focal length is less than the second threshold.

The distance between the moon and the terminal is very far, which is much greater than the focal length used by the user for daily image capturing. In the moon image capturing mode, the focusing length of AF may be set as the infinite focal length, or close to the infinite focal length.

In some embodiments, adjusting the image capturing parameters in the moon image capturing mode further includes at least one of the following methods.

Third, increasing the available level range of ZOOM from the first level range to the second level range, in which the maximum level of the second level range is greater than that of the first level range.

Since the moon is far away from the terminal, in addition to setting the focusing length of AF as the infinite focal length, the available level range of ZOOM may further be increased from the first level range to the second level range, in which the maximum level of the second level range is greater than that of the first level range. The first level range refers to the ZOOM level range adopted by the Auto mode or the night view mode.

In some embodiments, the minimum level of the first level range is the same as that of the second level range, and the maximum level of the second level range is twice as much as that of the first level range. For example, the first level range is [1.0×, 10×] and the second level range is [1.0×, 20×].

In some embodiments, the minimum level of the second level range is the same as the maximum level of the first level range, and the maximum level of the second level range is twice as much as that of the first level range. For example, the first level range is [1.0×, 10×] and the second level range is [10×, 20×].

Fourth, adjusting the color temperature of the pixel area where the luminance value is greater than the first threshold to the preset color temperature range.

In the moon image capturing mode, the white balance of the preview image is mainly affected by the moon area. The terminal adjusts the color temperature of the pixel area (i.e., the moon area) where the luminance value is greater than the first threshold to the preset color temperature range. Or, in other words, the color temperature in the image capturing parameters is adjusted to the preset color temperature range on the basis of the color temperature of the pixel area (i.e., the moon area) where the luminance value is greater than the first threshold. In some embodiments, the preset color temperature range ranges from 4,500K to 5,000K, K being an abbreviation of the unit Kelvin.

Fifth, adjusting the image clarity to the preset clarity range.

In the moon image capturing mode, the terminal further adjusts the image clarity (acuteness) of the preview image to the preset clarity range by a dynamic adjusting algorithm. In some embodiments, the clarity adjustment and the ZOOM level adjustment are associated with each other. For example, the ZOOM level is dynamically adjusted to a certain level close to the maximum level, thereby obtaining a better image clarity.

In step 607, the preview image obtained on the basis of the image capturing parameters corresponding to the moon image capturing mode is displayed on the image capturing preview interface of the image capturing program.

In step 608, the preview image is shot as the moon image upon the reception of the shutter signal.

The shutter signal is a signal used for triggering image capturing. The shutter signal may either be triggered by the user, or automatically generated by the terminal. For example, the shutter signal is generated when the user touches the image capturing button. Or, the shutter signal is generated when the user double-clicks the lower part of the volume button. In this embodiment, the generation method of the shutter signal is not limited.

As such, with the method provided in this embodiment, the image capturing scene of the preview image is identified by calling the machine learning model. When the image capturing scene belongs to the moon scene, the moon image capturing mode in the image capturing program may be activated to capture the moon image, such that the moon image with a better image quality may be captured.

With the method provided in this embodiment, the machine learning model is called to identify the image capturing scene of the preview image when the ZOOM level is greater than the preset level. The machine learning model is called to perform calculations only when the user intends to shoot the moon, thereby reducing unnecessary calculations and reducing performance occupation and power loss resulted from the calculations of the machine learning model.

With the method provided in this embodiment, the default camera used is switched from the wide-angle camera to the telephoto camera when the moon image capturing mode is activated. Consequently, the telephoto camera with the telephoto image capturing property can be used to obtain the moon image with better quality.

With the method provided in this embodiment, the light-measuring mode of AE is adjusted to the local light-measuring mode, thereby avoiding an inaccurate light-measuring of the global light-measuring mode in the moon image capturing scene. Consequently, the overexposure may be avoided in the moon area, and a reasonably exposed moon image can be obtained.

With the method provided in this embodiment, the focusing length of AF is adjusted to infinity or approach infinity, thereby overcoming the defect that the automatic focus cannot focus at an appropriate focal length due to a long distance between the moon and the terminal, and improving the quality of the shot moon image.

With the method provided in this embodiment, the available level range of ZOOM is adjusted to the second level range, thereby overcoming the defect that the level range used in the Auto mode cannot zoom into an appropriate focal length due to a long distance between the moon and the terminal. The second level range at a higher rank is adopted to improve the quality of the shot moon image.

Because the calculation amount of the machine learning model is relatively high, in order to reduce unnecessary calculations as many as possible and improve the degree of artificial intelligence of the terminal, the terminal further needs to judge whether the current image capturing scene satisfies pre-checking conditions before calling the machine learning model to identify the image capturing scene on the basis of alternative embodiments of each of the above embodiments. When the pre-checking conditions are satisfied, the machine learning model is called to identify the image capturing scene of the preview image.

In some embodiments, a judgment process of the pre-checking conditions includes, but is not limited to, at least one of the following three methods.

First, meta data of a camera is acquired; whether the preview image is an image displayed on the liquid crystal display is detected according to the meta data; and the image capturing scene of the preview image is identified by calling the machine learning model when the preview image is not an image displayed on the liquid crystal display.

Considering that it is not a real moon image capturing scene when the user takes a picture of the moon image displayed on the liquid crystal display (for example, a computer, a laptop or other mobile phones), the terminal acquires the meta data of the camera and detects whether the preview image is an image displayed on the liquid crystal display according to the meta data. For example, the meta data includes exposure time and photosensibility (ISO). When the exposure time is less than a third threshold and the photosensibility is less than a fourth threshold, it is determined that the preview image is an image displayed on the liquid crystal display. When the exposure time is no less than the third threshold and the photosensibility is no less than the fourth threshold, it is determined that the preview image is not an image displayed on the liquid crystal display.

When the preview image is not an image displayed on the liquid crystal display, the machine learning model is called to identify the image capturing scene of the preview image. When the preview image is an image displayed on the liquid crystal display, the machine learning model is not called to identify the image capturing scene of the preview image, and other operations are executed. Other operations include, but are not limited to: calling another machine learning model to identify the image capturing scene of the preview image, or image capturing with the Auto mode, etc.

Second, attitude data of the terminal is acquired; whether the image capturing attitude of the terminal is the upward image capturing attitude is detected according to the attitude data; and the image capturing scene of the preview image is identified by calling the machine learning model when the attitude data indicates the upward image capturing attitude.

The attitude data of the terminal may be attitude data collected by a gravitational acceleration sensor and/or an angular velocity sensor.

In some embodiments, the component of a gravitational acceleration on each coordinate axis is used to determine whether the current attitude of the terminal is the upward attitude. The component changes of the gravitational acceleration on each coordinate axis, and/or the component changes of an angular velocity on each coordinate axis are used to determine whether the current attitude of the terminal is an image capturing attitude (the image capturing attitude is a state in which the terminal is relatively stationary).

In some embodiments, when the current attitude of the terminal is the horizontal attitude or downward attitude, the scene does not belong to the moon image capturing scene, and thus it is unnecessary to start the machine learning model to identify the image capturing scene. When the terminal moves or rotates vigorously, it also does not belong to the moon image capturing scene, and thus it is unnecessary to start the machine learning model to identify the image capturing scene.

Third, image semantic identification is performed on the focus area of the preview image; and the image capturing scene of the preview image is identified by calling the machine learning model when the image semantic identification indicates that the focus area is of the point light source type.

In some embodiments, the focus area is an area where the focus is located, and the focus area also changes when the focus changes. Or, the focus area is a relatively fixed area. For example, the focus area is located in a middle-upper part of the image capturing window.

In some embodiments, the moon image capturing mode is one of the point light source image capturing modes. When the focus area in the preview image is not of a point light source type, it is unnecessary to call the machine learning model to identify the image capturing scene of the preview image.

As such, with the method provided in this embodiment, the machine learning model is called to identify the image capturing scene when the pre-checking conditions are satisfied, thereby reducing unnecessary calculations of the machine learning model. In addition, given that the pre-checking conditions are designed based on various kinds of auxiliary data such as the meta data of the camera, the attitude data of the terminal or the image semantic identification, the degree of intelligence of the image capturing program may be improved.

An AI (Artificial Intelligence) chip may be disposed in the terminal provided in each of the above embodiments. The calculation process of the machine learning model described above is executed by the AI chip, thus the calculation speed of the machine learning model is improved. The terminal may be a mobile terminal, such as a smart phone, a tablet computer, a portable computer, an MP3, an MP4, and so on.

The following are device embodiments of the present disclosure that may be used to implement the method embodiments of the present disclosure. For details not disclosed in the device embodiments of the present disclosure, reference may be made to the method embodiments of the present disclosure.

Figure 7:
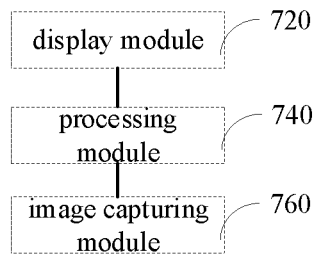
FIG. 7 is a block diagram of an image capturing device according to some embodiments.

FIG. 7 is a block diagram of an image capturing device according to some embodiments. The image capturing device may be implemented as part of or the entire terminal by software, hardware or a combination thereof. The image capturing device may include a display module 720, a processing module 740 and an image capturing module 760.

The various device components, blocks, or portions may have modular configurations, or are composed of discrete components, but nonetheless may be referred to as "modules" in general. In other words, the "modules" referred to herein may or may not be in modular forms.

The display module 720 is configured to display the image capturing preview interface of the image capturing program, the image capturing preview interface displaying the preview image.

The processing module 740 is configured to identify the image capturing scene of the preview image by calling the machine learning model.

The image capturing module 760 is configured to activate the moon image capturing mode in the image capturing program when the image capturing scene belongs to the moon image capturing scene, the moon image capturing mode being the image capturing mode configured to shoot the moon in the sky.

In an alternative embodiment, the image capturing module 760 is configured to activate the moon image capturing mode in the image capturing program when the level of the digital zoom ZOOM is greater than the preset level and the image capturing scene belongs to the moon image capturing scene.

In an alternative embodiment, the image capturing module 760 is configured to display the activation control of the moon image capturing mode on the image capturing preview interface when the level of the digital zoom ZOOM is greater than the preset level and the image capturing scene belongs to the moon image capturing scene; and activate the moon image capturing mode in the image capturing program upon receiving the trigger signal on the activation control.

In an alternative embodiment, the activation control of the moon image capturing mode is the switch control of the moon image capturing mode and a night image capturing mode.

In an alternative embodiment, the processing module 740 is configured to acquire metadata of the camera; detect whether the preview image is an image displayed on the liquid crystal display according to the metadata; and identify the image capturing scene of the preview image by calling the machine learning model when the preview image is not an image displayed on the liquid crystal display.

In an alternative embodiment, the processing module 740 is configured to acquire attitude data of the terminal; detect whether the image capturing attitude of the terminal is the upward image capturing attitude according to the attitude data; and identify the image capturing scene of the preview image by calling the machine learning model when the attitude data indicates the upward image capturing attitude.

In an alternative embodiment, the processing module 740 is configured to perform image semantic identification on the focus area of the preview image; and identify the image capturing scene of the preview image by calling the machine learning model when the image semantic identification indicates that the focus area is of the point light source type.

In an alternative embodiment, the device is applied to a terminal having both the wide-angle camera and the telephoto camera, and the processing module 740 is configured to switch the camera used for image capturing from the wide-angle camera to the telephoto camera.

In an alternative embodiment, the machine learning model is obtained based on training sample images in the training set with the error back propagation algorithm, and the training set includes the positive sample image set and the negative sample image set;

the positive sample image set includes the moon images and the artificial moon images shot by the test terminal; and
the negative sample image set includes non-moon images.

In an alternative embodiment, the artificial moon image is an image obtained by synthesizing the night sky image and the moon region image, and the moon region image is obtained from performing image matting on the moon image shot by the test terminal.

In an alternative embodiment, the non-moon images include the streetlight images.

It should be noted that the image capturing device provided in the above embodiments is merely illustrated by the division of respective functional modules when taking a picture of the moon. In practical applications, the above functions may be assigned to different functional modules according to practical requirements. In other words, the content and structure of the device are divided into different functional modules to accomplish all or part of the functions described above.

With regard to the device in the above embodiments, specific implementation for operations of respective module has been described in detail in embodiments related to the method, and thus will not be elaborated herein.

Some embodiments of the present disclosure also provide an image capturing device capable of implementing the image capturing method provided in the present disclosure. The device includes a processor and a memory for storing instructions executable by the processor. The processor is configured to perform the image capturing method provided by various method embodiments described above.

Figure 8:
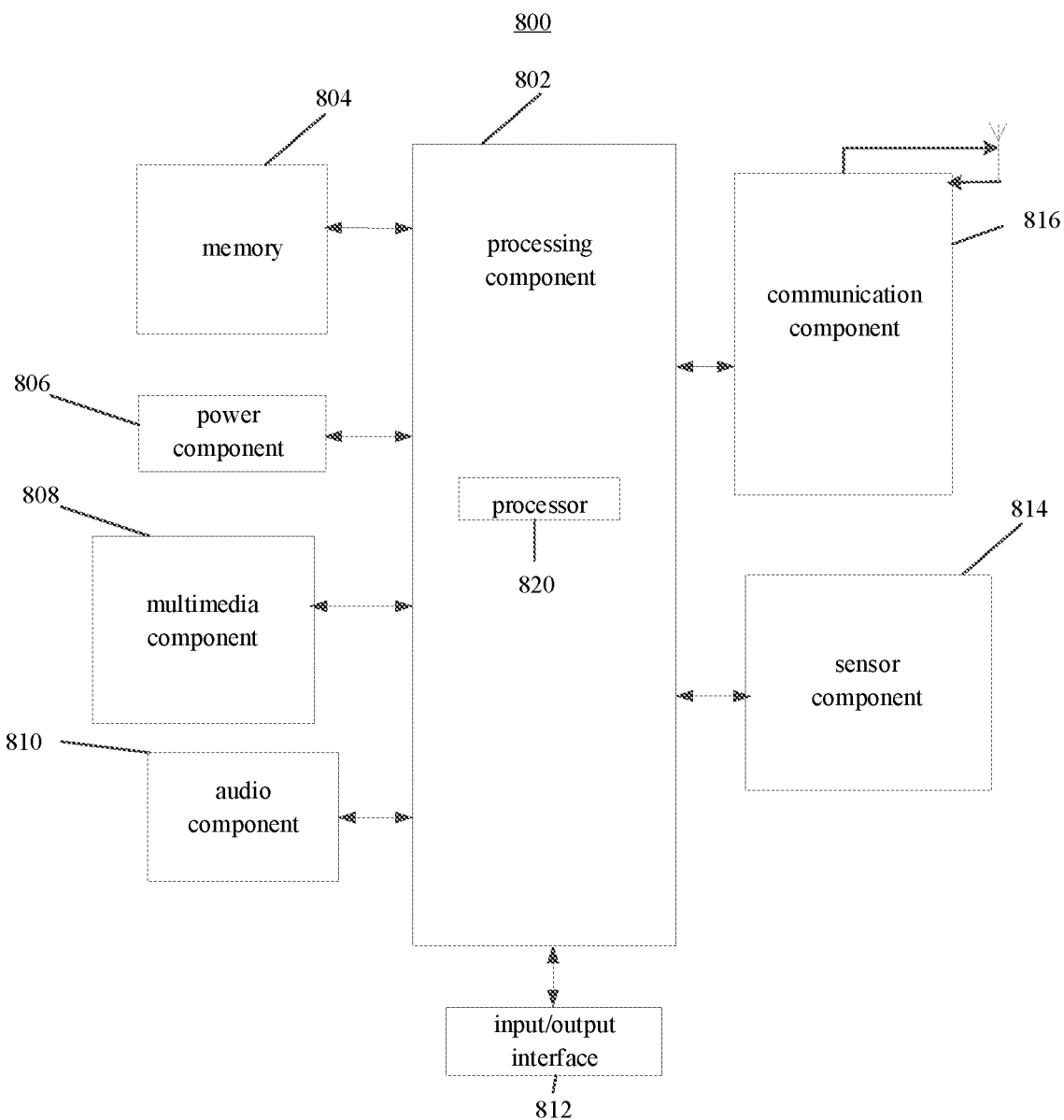
FIG. 8 is a block diagram of a terminal according to some embodiments.

FIG. 8 is a block diagram of a terminal 800 according to some embodiments. For example, the terminal 800 may be a mobile phone, a computer, a digital broadcast terminal, a messaging device, a game console, a tablet device, a medical device, an exercise device, a personal digital assistant, and so on.

Referring to FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 normally controls the overall operation (such as operations associated with displaying, telephone calls, data communications, camera operations and recording operations) of the terminal 800. The processing component 802 may include one or a plurality of processors 820 to execute instructions so as to perform all or part of the steps of the above described method. In addition, the processing component 802 may include one or a plurality of units to facilitate interactions between the processing component 802 and other components. For example, the processing component 802 may include a multimedia unit to facilitate interactions between the multimedia component 808 and the processing component 802.

The memory 804 is configured to store various types of data to support operations at the terminal 800. Examples of such data include instructions for any application or method operated on the terminal 800, contact data, phone book data, messages, images, videos and the like. The memory 804 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the terminal 800. The power component 806 may include a power management system, one or a plurality of power sources and other components associated with power generation, management, and distribution of the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 808 includes a front camera and/or a rear camera. When the terminal 800 is in an operation mode such as an image capturing mode or a video mode, the front camera and/or the rear camera may receive external multimedia data. Each front camera and rear camera may be a fixed optical lens system or have a focal length and an optical zoom capability.

In some embodiments, the display screen is an organic light-emitting diode (OLED) display screen, such as a rigid Active-matrix Organic Light-Emitting Diode (AMOLED) display screen, a flexible AMOLED display screen, or other types of displays.

To provide for interaction with a user, implementations of the subject matter described in this specification can be implemented with other types of devices as well, e.g., a virtual reality (VR)/augmented reality (AR) device, a head-mount display (HMD) device, a head-up display (HUD) device, smart eyewear (e.g., glasses), or any other monitor for displaying information to the user and a keyboard, a pointing device, e.g., a mouse, trackball, rocker switch etc., or a touch screen, touch pad, etc., by which the user can provide input to the apparatus.

The audio component 810 is configured to output and/or input an audio signal. For example, the audio component 810 includes a microphone (MIC) that is configured to receive an external audio signal when the terminal 800 is in an operation mode such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface unit. The peripheral interface unit may be a keyboard, a click wheel, a button and so on. These buttons may include, but are not limited to, a home button, a volume button, a start button, and a locking button.

The sensor assembly 814 includes one or a plurality of sensors for providing the terminal 800 with various aspects of status assessments. For example, the sensor component 814 may detect an open/closed state of the terminal 800 and a relative positioning of the components. For example, the components may be a display and a keypad of the terminal 800. The sensor component 814 may also detect a change in position of the terminal 800 or a component of the terminal 800, the presence or absence of contact of the user with the terminal 800, the orientation or acceleration/deceleration of the terminal 800 and a temperature change of the terminal 800. The sensor component 814 may include a proximity sensor configured to detect the presence of nearby objects without any physical contact. The sensor component 814 may also include a light sensor (such as a CMOS or a CCD image sensor) for use in imaging applications. In some embodiments, the sensor component 814 may further include an acceleration sensor, a gyro sensor, a magnetic sensor, a pressure sensor, or a temperature sensor.

The communication component 816 is configured to facilitate wired or wireless communication between the terminal 800 and other devices. The terminal 800 may access a wireless network based on a communication standard such as Wi-Fi, 2G, 3G, 4G, 5G, or a combination thereof. In some embodiments, the communication component 816 receives broadcast signals or broadcast-associated information from an external broadcast management system via a broadcast channel. In some embodiments, the communication component 816 further includes a near field communication (NFC) unit to facilitate short range communication.

In some embodiments, the terminal 800 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above image capturing method.

The apparatus may implement the above-mentioned method in the present disclosure through software, hardware or a combination thereof.

In some embodiments, there is also provided a non-transitory computer readable storage medium including instructions, such as a memory 804 including instructions. The instructions are executable by the processor 820 of the terminal 800 to perform the above method. For example, the non-transitory computer readable storage medium may be a ROM, a random-access memory (RAM), a CD-ROM, a magnetic tape, a floppy disk, an optical data storage device, etc.

Processors suitable for the execution of a computer program such as the instructions described above include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

The non-transitory computer readable storage medium enables the terminal 800 to perform the image capturing method provided by each method embodiment described above when instructions in the storage medium are executed by the processor of the terminal 800.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It should be understood that "a plurality of" referred to herein means two or more. The expression "and/or" describes the association relationship of the associated objects and expresses that three kinds of relationships may exist. For example, A and/or B may indicate that three cases where A exists independently, A and B exist at the same time, and B exists independently. The character "/" generally indicates that the associated objects before and after the character are in an "or" relationship.

In the present disclosure, it is to be understood that the terms "lower," "upper," "center," "left," "right," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An image capturing method, comprising: displaying an image capturing preview interface of an image capturing program, the image capturing preview interface displaying a preview image; identifying an image capturing scene of the preview image by calling a machine learning model; and activating a moon image capturing mode in the image capturing program when the image capturing scene is a moon image capturing scene, the moon image capturing mode being an image capturing mode configured to capture an image of the moon in a night sky; wherein the activating a moon image capturing mode in the image capturing program when the image capturing scene belongs to a moon image capturing scene comprises: activating the moon image capturing mode in the image capturing program when a level of the digital zoom is greater than a preset level and the image capturing scene belongs to the moon image capturing scene by displaying an activation control of the moon image capturing mode on the image capturing preview interface when the level of the digital zoom is greater than the preset level and the image capturing scene belongs to the moon image capturing scene; and activating the moon image capturing mode in the image capturing program upon receiving a trigger signal on the activation control; wherein the activation control of the moon image capturing mode is a switching control of the moon image capturing mode and a night image capturing mode.

2. The method according to claim 1, wherein the identifying an image capturing scene of the preview image by calling a machine learning model comprises: acquiring meta data of a camera; detecting whether the preview image is an image displayed on a liquid crystal display according to the meta data; and identifying the image capturing scene of the preview image by calling the machine learning model when the preview image is not an image displayed on the liquid crystal display.

3. The method according to claim 1, wherein the identifying an image capturing scene of the preview image by calling a machine learning model comprises: acquiring attitude data of a terminal; detecting whether an image capturing attitude of the terminal is an upward image capturing attitude according to the attitude data; and identifying the image capturing scene of the preview image by calling the machine learning model when the attitude data indicates the upward image capturing attitude.

4. The method according to claim 1, wherein identifying an image capturing scene of the preview image by calling a machine learning model comprises: performing image semantic identification on a focus area of the preview image; and identifying the image capturing scene of the preview image by calling the machine learning model when the image semantic identification indicates that the focus area is of a point light source type.

5. The method according to claim 1, wherein the method is applied to a terminal having both a wide-angle camera and a telephoto camera, and after activating the moon image capturing mode in the image capturing program, the method further comprises: switching a camera used for image capturing from the wide-angle camera to the telephoto camera.

6. The method according to claim 1, wherein the machine learning model is obtained based on training sample images in a training set with an error back propagation algorithm, and the training set comprises a positive sample image set and a negative sample image set; the positive sample image set comprises moon images and artificial moon images captured by a test terminal; the negative sample image set comprises non-moon images; the artificial moon image is an image obtained by synthesizing a night sky image and a moon region image, and the moon region image is obtained from performing image matting on the moon image shot by the test terminal; and the non-moon images comprise streetlight images.

7. An image capturing device, comprising: a processor; and a memory, configured to store one or more software modules executable by the processor, wherein the processor is configured to: display an image capturing preview interface of an image capturing program, the image capturing preview interface displaying a preview image; a processing module configured to identify an image capturing scene of the preview image by calling a machine learning model; and an image capturing module configured to activate a moon image capturing mode in the image capturing program when the image capturing scene belongs to a moon image capturing scene, the moon image capturing mode being an image capturing mode configured to capture an image of the moon in the sky; wherein the image capturing module is configured to activate the moon image capturing mode in the image capturing program when a level of a digital zoom is greater than a preset level and the image capturing scene belongs to the moon image capturing scene by displaying an activation control of the moon image capturing mode on the image capturing preview interface when the level of the digital zoom is greater than the preset level and the image capturing scene belongs to the moon image capturing scene; and activate the moon image capturing mode in the image capturing program upon receiving a trigger signal on the activation control; and wherein the activation control of the moon image capturing mode is a switching control of the moon image capturing mode and a night image capturing mode.

8. The device according to claim 7, wherein the processing module is configured to acquire meta data of a camera; detect whether the preview image is an image displayed on a liquid crystal display according to the meta data; and identify the image capturing scene of the preview image by calling the machine learning model when the preview image is not an image displayed on the liquid crystal display.

9. The device according to claim 7, wherein the processing module is configured to acquire attitude data of a terminal; detect whether an image capturing attitude of the terminal is an upward image capturing attitude according to the attitude data; and identify the image capturing scene of the preview image by calling the machine learning model when the attitude data indicates the upward image capturing attitude.

10. The device according to claim 7, wherein the processing module is configured to perform image semantic identification on a focus area of the preview image; and identify the image capturing scene of the preview image by calling the machine learning model when a result of the image semantic identification is that the focus area is of a point light source type.

11. The device according to claim 7, wherein the device is applied to a terminal having both a wide-angle camera and a telephoto camera, and the processing module is configured to switch a camera used for image capturing from the wide-angle camera to the telephoto camera.

12. The device according to claim 7, wherein the machine learning model is obtained based on training sample images in a training set with an error back propagation algorithm, and the training set comprises a positive sample image set and a negative sample image set; the positive sample image set comprises moon images and artificial moon images shot by the test terminal; the negative sample image set comprises non-moon images; the artificial moon image is an image obtained by synthesizing a night sky image and a moon region image, and the moon region image is obtained from performing image matting on the moon image shot by the test terminal; and the non-moon images comprise streetlight images.

13. A mobile terminal implementing the method of claim 1, the mobile terminal comprising: a display screen configured to perform the displaying; a processor configured to control the identifying and the activating; a wide-angle camera; and a telephoto camera; wherein: the processor is further configured to control switching between the wide-angle camera and the telephoto camera; the machine learning model is obtained based on training sample images in a training set with an error back propagation algorithm, and the training set comprises a positive sample image set and a negative sample image set; the positive sample image set comprises moon images and artificial moon images captured by a test terminal; the negative sample image set comprises non-moon images; the artificial moon image is an image obtained by synthesizing a night sky image and a moon region image, and the moon region image is obtained from performing image matting on the moon image shot by the test terminal; and the non-moon images comprise streetlight images.

* * * * *